(12) United States Patent
Mooney, Jr. et al.

(10) Patent No.: US 7,918,024 B2
(45) Date of Patent: Apr. 5, 2011

(54) METHODS AND APPARATUS FOR MANUFACTURING COMPONENTS

(75) Inventors: Frank Delano Mooney, Jr., Henderson, KY (US); Gary Eugene Wheat, Madisonville, KY (US); Timothy Riggs, Madisonville, KY (US); Kenneth Ray Hill, Jr., Madisonville, KY (US); Ronald Dale Edwards, Dixon, KY (US)

(73) Assignee: General Electric Company, Schenectady, NY (US)

( * ) Notice: Subject to any disclaimer, the term of this patent is extended or adjusted under 35 U.S.C. 154(b) by 1317 days.

(21) Appl. No.: 11/336,002

(22) Filed: Jan. 20, 2006

(65) Prior Publication Data
US 2007/0169344 A1 Jul. 26, 2007

(51) Int. Cl.
*B21K 25/00* (2006.01)
*B23Q 7/00* (2006.01)
*B25B 27/14* (2006.01)
*B25B 1/24* (2006.01)

(52) U.S. Cl. ..... 29/889.21; 29/559; 29/889.2; 29/281.1; 269/270

(58) Field of Classification Search .................. 29/889.2, 29/889.22, 464, 240, 56.5, 281.1, 281.6, 29/557; 269/37, 43, 296, 909, 71, 73
See application file for complete search history.

(56) References Cited

U.S. PATENT DOCUMENTS

| | | | | |
|---|---|---|---|---|
| 2,143,462 | A * | 1/1939 | Allard | 29/889.22 |
| 2,488,296 | A * | 11/1949 | Kraus | 269/71 |
| 3,566,068 | A * | 2/1971 | Bruner et al. | 219/69.17 |
| 3,920,947 | A | 11/1975 | Wachtell et al. | |
| 3,963,894 | A | 6/1976 | Wachtell et al. | |
| 4,374,084 | A | 2/1983 | Meetham et al. | |
| 5,174,715 | A * | 12/1992 | Martin | 415/209.4 |
| 5,492,050 | A * | 2/1996 | Holtgraver | 92/74 |
| 6,119,339 | A | 9/2000 | Richter et al. | |
| 6,183,193 | B1 | 2/2001 | Glasspoole et al. | |
| 6,886,346 | B2 | 5/2005 | Sobieski et al. | |
| 6,915,636 | B2 | 7/2005 | Stuttaford et al. | |
| 7,503,113 | B2 * | 3/2009 | Gosling et al. | 29/889.1 |
| 7,575,415 | B2 * | 8/2009 | Drerup et al. | 415/135 |
| 7,635,119 | B1 * | 12/2009 | Patel | 269/73 |
| 2004/0244180 | A1 * | 12/2004 | Jones et al. | 29/559 |
| 2005/0268461 | A1 * | 12/2005 | Ouellette et al. | 29/889.7 |

* cited by examiner

*Primary Examiner* — David P Bryant
*Assistant Examiner* — Alexander P Taousakis
(74) *Attorney, Agent, or Firm* — William Scott Andes, Esq.; Armstrong Teasdale LLP

(57) ABSTRACT

A method for manufacturing a turbine nozzle assembly using a fixture includes providing a first position of the fixture, positioning at least one datum of the turbine nozzle assembly adjacent at least one datum location point on the fixture when the fixture is in the first position, coupling the turbine nozzle assembly to the fixture when the fixture is in the first position, rotating the fixture from the first position into a second position that facilitates manufacturing the turbine nozzle assembly, and performing a manufacturing process on the turbine nozzle assembly when the fixture is in the second position.

10 Claims, 8 Drawing Sheets

METHODS AND APPARATUS FOR MANUFACTURING COMPONENTS

BACKGROUND OF THE INVENTION

This invention relates generally to manufacturing components, and more specifically to methods and apparatus for aligning, supporting, and/or securing components for manufacture.

Accurate manufacturing of gas turbine engine components may be a significant factor in determining both manufacturing timing and cost. For example, when the component is a gas turbine engine nozzle assembly, accurate manufacturing of the nozzle may be a significant factor affecting an overall cost of fabrication of the gas turbine engine, as well as subsequent modifications, repairs, and inspections of the blade. To align a component for manufacture, the component may be coupled to a fixture that includes at least one surface that locates a plurality of datums on the component. However, accurately aligning the component and holding the component in such alignment during manufacturing processes may be difficult. Moreover, it may be difficult to load and/or unload the component from the fixture when the fixture is positioned for such manufacturing processes. Accordingly, aligning the component may be more time consuming and/or require specialized operator training, possibly increasing manufacturing cycle times and manufacturing costs. Furthermore, some machined surfaces may include datums that are used to locate the component for subsequent manufacturing processes. An accuracy of the dimensions of such machined surfaces may therefore determine an accuracy of the dimensions of other surfaces of the component that are subsequently machined, as well as the overall dimensions of the finished component. Moreover, it may be difficult to check that the component is positioned in a desired location and/or orientation when the fixture is positioned for such manufacturing processes.

BRIEF DESCRIPTION OF THE INVENTION

In one aspect, a method is provided for manufacturing a turbine nozzle assembly using a fixture. The method includes providing a first position of the fixture, positioning at least one datum of the turbine nozzle assembly adjacent at least one datum location point on the fixture when the fixture is in the first position, coupling the turbine nozzle assembly to the fixture when the fixture is in the first position, rotating the fixture from the first position into a second position that facilitates manufacturing the turbine nozzle assembly, and performing a manufacturing process on the turbine nozzle assembly when the fixture is in the second position.

In another aspect, an assembly is provided for use in manufacturing a turbine nozzle assembly that includes at least one datum. The assembly includes a base, and a fixture rotatably coupled to the base for rotation with respect to the base. The fixture includes at least one datum location point and is rotatable with respect to the fixture between a first position that facilitates coupling the turbine nozzle assembly to the fixture and a second position that facilitates performing a manufacturing process on the turbine nozzle assembly. The assembly also includes a clamp coupled to the fixture for applying force to the turbine nozzle assembly to fixedly secure the turbine nozzle assembly to the fixture such that the at least one turbine nozzle datum is aligned with the at least one datum location point.

DETAILED DESCRIPTION OF THE INVENTION

As used herein, the terms "manufacturing" and "manufacture" may include any process for shaping and/or evaluating a component, such as, but not limited to fabrication and/or inspection. As used herein the terms "machining," "machine," and "machined" may include any process used for shaping a component. For example, processes used for shaping a component may include, but are not limited to including, turning, planing, milling, grinding, finishing, polishing, and/or cutting. In addition, and for example, shaping processes may include, but are not limited to including, processes performed by a machine, a machine tool, and/or a human being. The above examples are intended as exemplary only, and thus are not intended to limit in any way the definition and/or meaning of the terms "machining," "machine," and "machined".

As used herein, the terms "inspection" and "inspecting" may include any inspection process. For example, inspection processes may include measurement by a machine, measurement by humans, visual inspection by a machine, and/or visual inspection by a human. The above examples are intended as exemplary only, and thus are not intended to limit in any way the definition and/or meaning of the terms "inspection" and "inspecting". In addition, as used herein the term "component" may include any object that has been or may be manufactured. Moreover, as used herein the terms "positioning" and "positioned" are intended to include, but are not limited to, locating and/or orientating.

Figure 1:
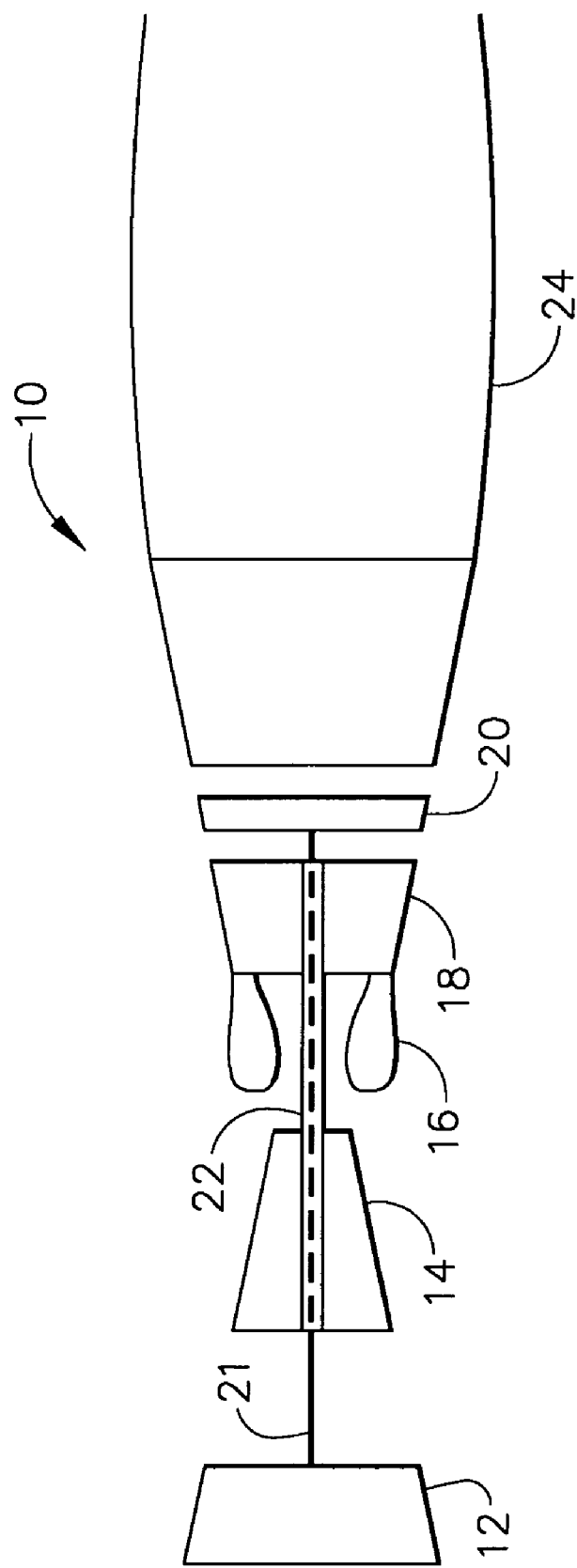
FIG. 1 is a schematic of an exemplary gas turbine engine.

FIG. 1 is a schematic illustration of an exemplary gas turbine engine 10 including a low pressure compressor 12, a high pressure compressor 14, and a combustor 16. Engine 10 also includes a high pressure turbine 18 and a low pressure turbine 20. Compressor 12 and turbine 20 are coupled by a first shaft 21, and compressor 14 and turbine 18 are coupled by a second shaft 22. In one embodiment, gas turbine engine 10 is an LM2500 engine commercially available from General Electric Aircraft Engines, Cincinnati, Ohio. In another embodiment, gas turbine engine 10 is a CFM engine commercially available from General Electric Aircraft Engines, Cincinnati, Ohio.

In operation, air flows through low pressure compressor 12 supplying compressed air from low pressure compressor 12 to high pressure compressor 14. The highly compressed air is delivered to combustor 16. Airflow from combustor 16 is channeled through a turbine nozzle (not shown in FIG. 1) to drive turbines 18 and 20, prior to exiting gas turbine engine 10 through an exhaust nozzle 24.

Figure 2:
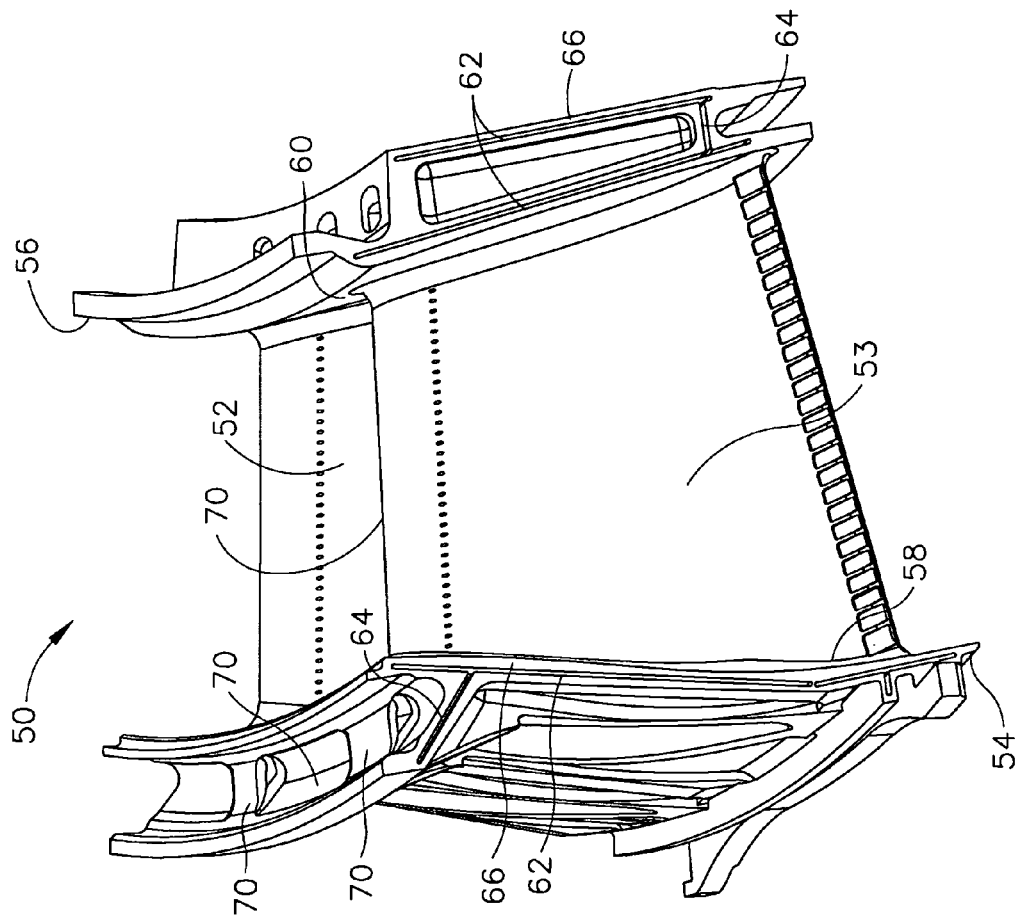
FIG. 2 is a perspective view of an exemplary turbine nozzle assembly for use in a gas turbine engine, such as the exemplary gas turbine engine shown in FIG. 1.
Figure 3:
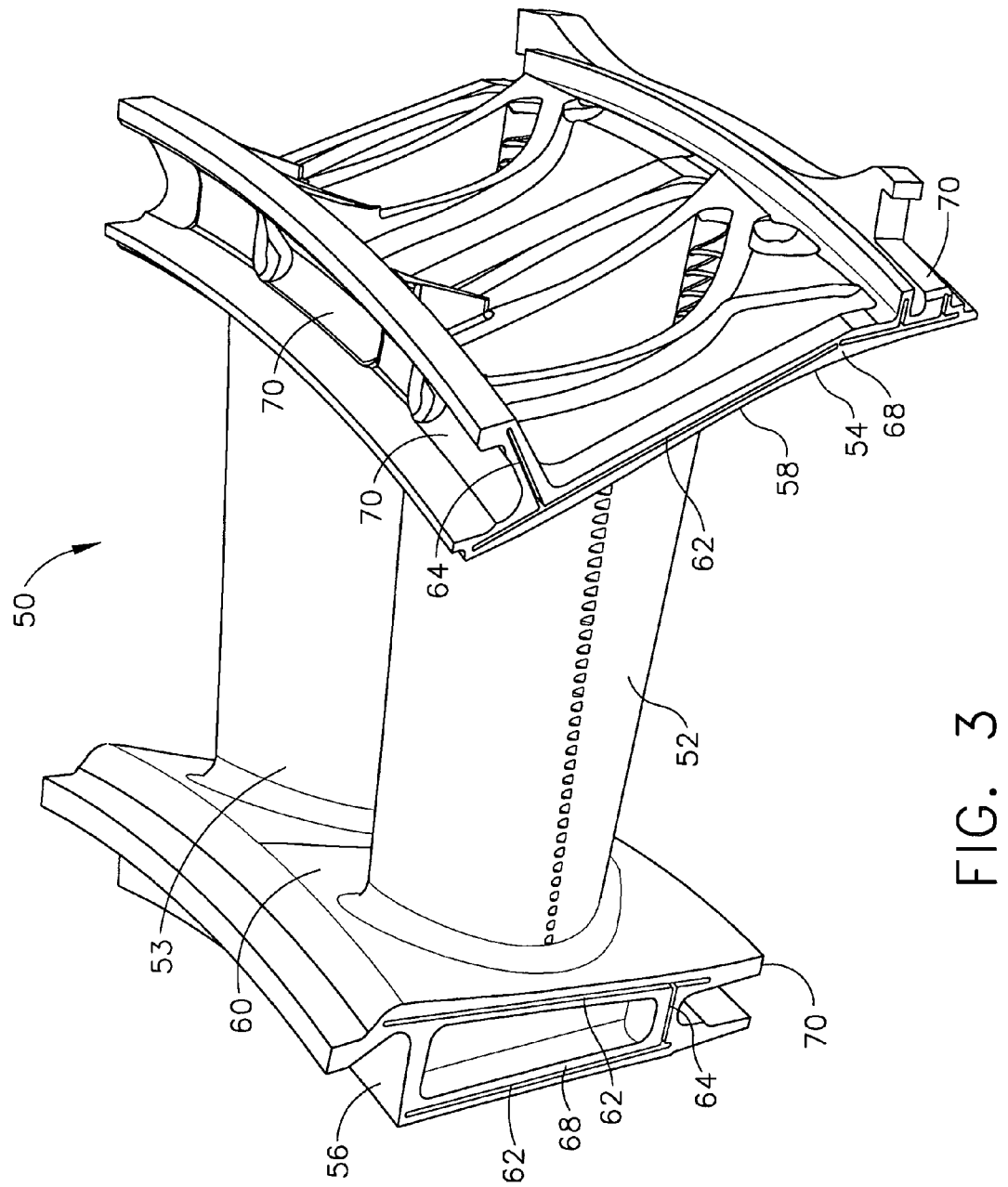
FIG. 3 is another perspective view of the exemplary turbine nozzle shown in FIG. 2.

FIGS. 2 and 3 are perspective views of an exemplary turbine nozzle assembly 50 that may be used with a gas turbine engine, such as engine 10 (shown in FIG. 1). In the exemplary embodiment, nozzle assembly 50 includes two airfoils 52 and 53 and is generally known as a doublet. In such an embodiment, a plurality of turbine nozzle assemblies 50 are circumferentially coupled together to form a turbine nozzle ring (not shown). In the exemplary embodiment, doublet 50 includes a plurality of circumferentially-spaced airfoils 52 and 53 coupled together by an arcuate radially outer band or platform 54, and an arcuate radially inner band or platform 56. More specifically, in the exemplary embodiment, each band 54 and 56 is integrally-formed with airfoils 52 and 53, and each doublet 50 includes two airfoils 52 and 53. In an alternative embodiment, a nozzle assembly that includes a single airfoil 52 or 53 and is generally known as a singlet. In yet another alternative embodiment, a nozzle assembly that includes three airfoils, such as airfoils 52 and 53 and another airfoil (not shown), is generally known as a triplet. In the exemplary embodiment, outer band 54 includes a radially inner surface 58 and inner band 56 includes a radially inner surface 60. Inner surfaces 58 and 60 define a flow path for combustion gases to flow through turbine nozzle assembly 50. In the exemplary embodiment, the combustion gases are channeled through turbine nozzle assembly 50 to turbines 18 or 20 (shown in FIG. 1). Nozzle assembly 50 also includes a pair of opposite and axially-extending faces 66 and 68 that each include one or more axial spline seal slots 62 and one or more radial spline seal slots 64.

In the exemplary embodiment turbine nozzle assembly 50 includes one or more datums 70 (some of which may not be shown and/or labeled with reference numeral 70) to facilitate positioning turbine nozzle assembly 50 for a manufacturing process, as will be described in more detail below. As described and illustrated herein, datums 70 are exemplary only. As such, and despite how datums 70 are illustrated, turbine nozzle assembly 50 may include any number of datums that are each positioned anywhere on turbine nozzle assembly 50 that enable the datums to function as described herein.

Figure 4:
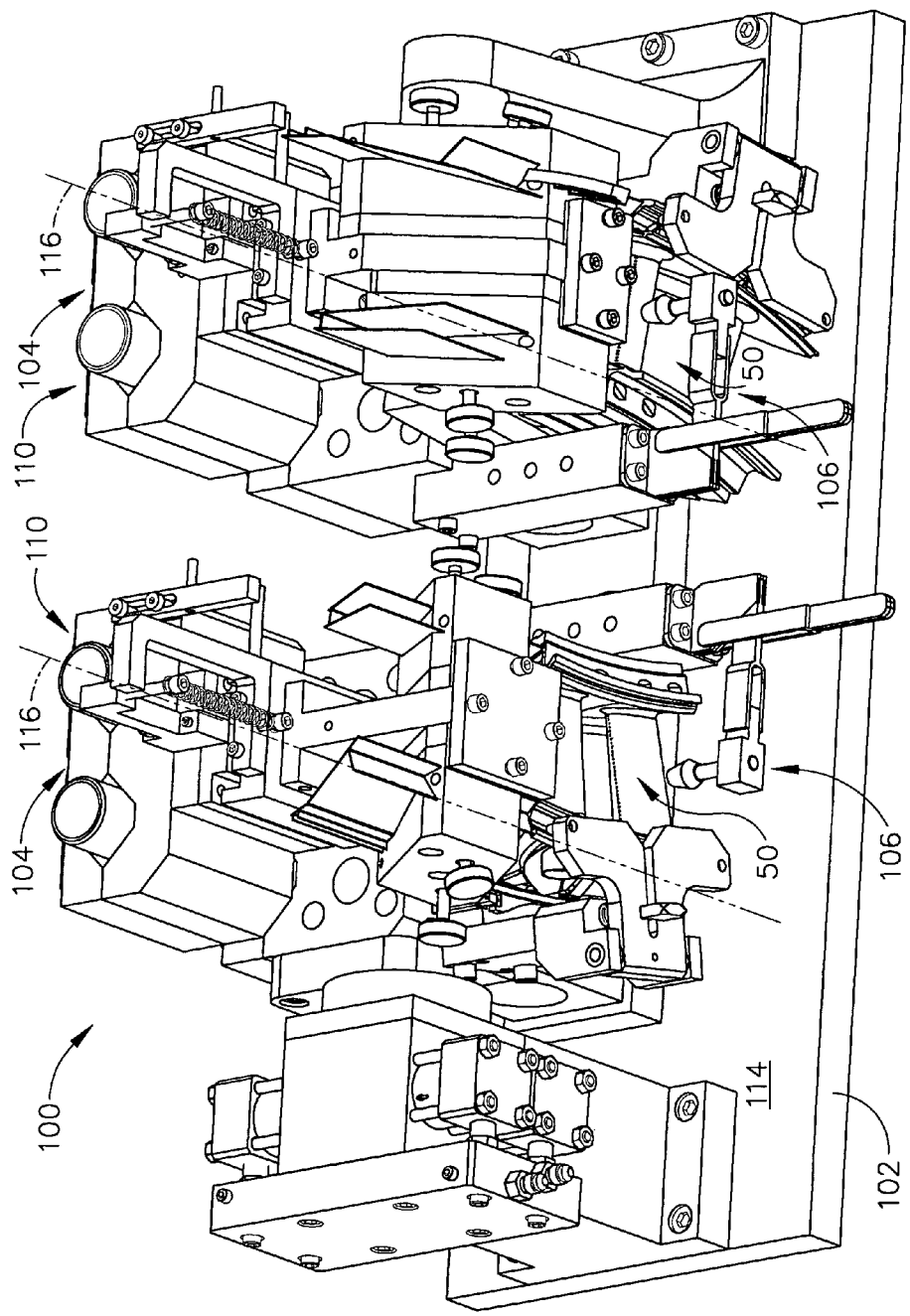
FIG. 4 is a perspective view of an exemplary embodiment of a fixture assembly for use in manufacturing a component, such as the exemplary turbine nozzle assembly shown in FIGS. 2 and 3.
Figure 5:
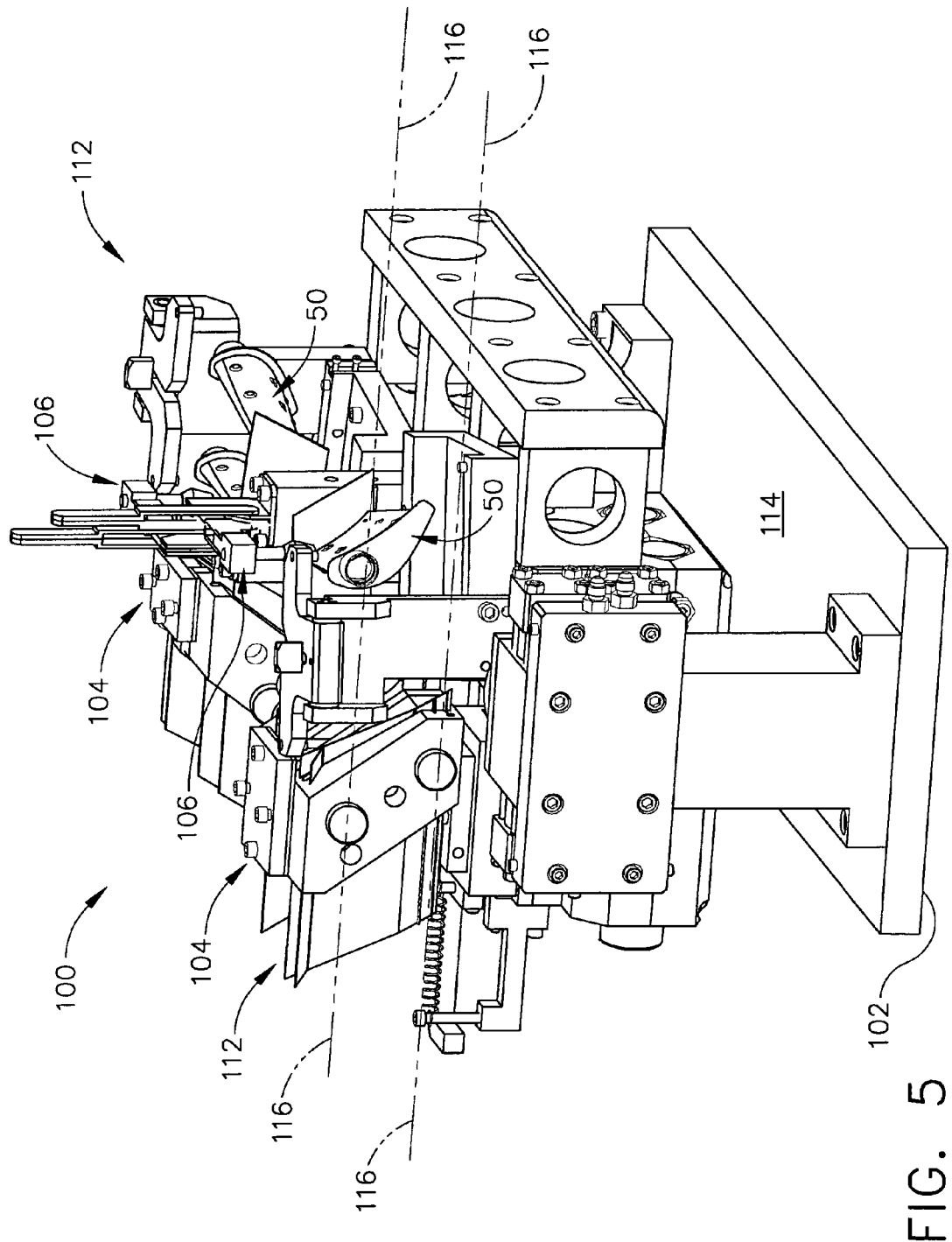
FIG. 5 is a perspective view of the exemplary fixture assembly shown in FIG. 4.
Figure 6:
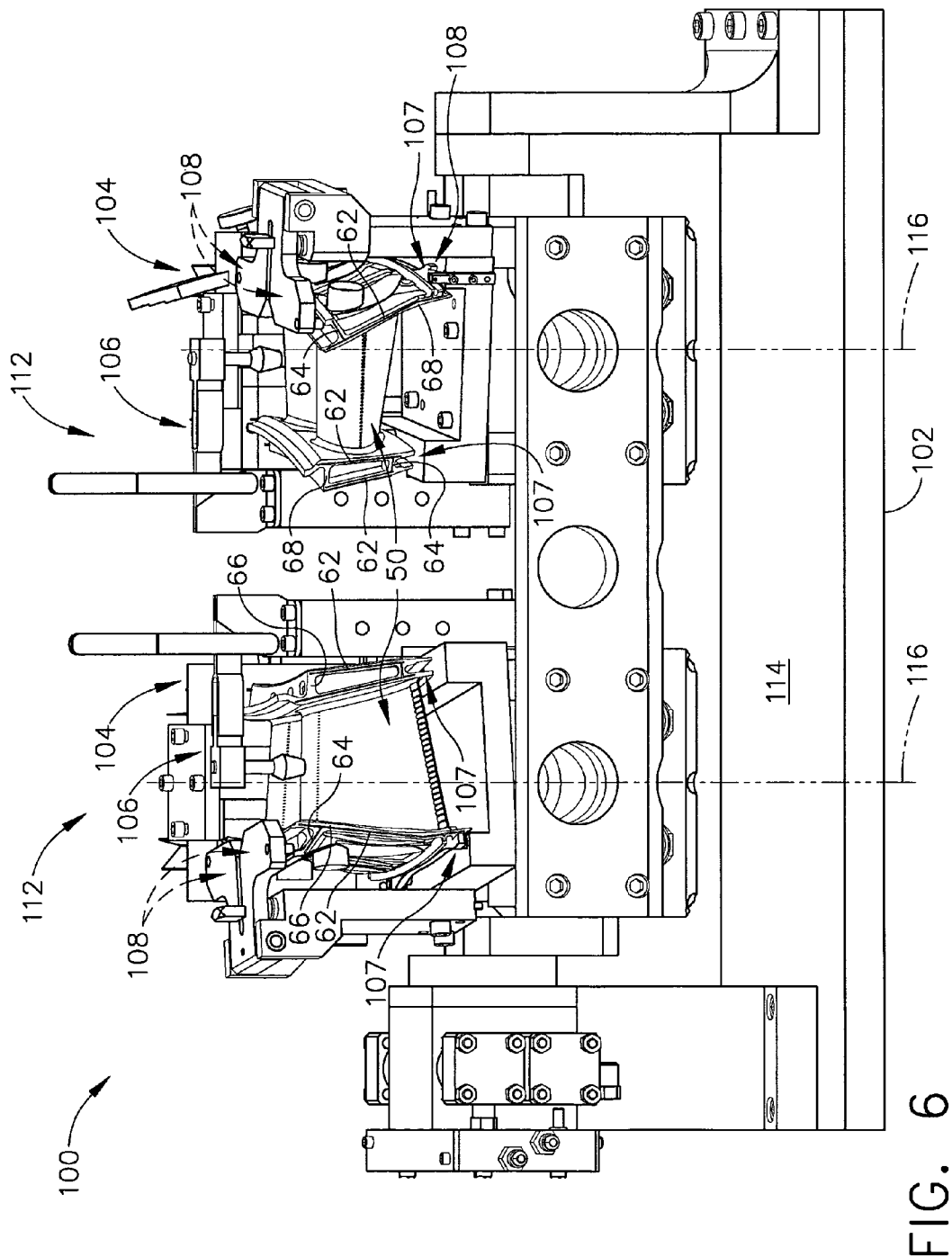
FIG. 6 is a side view of the exemplary fixture assembly shown in FIGS. 4 and 5 in a position that facilitates coupling a component to the fixture, such as the exemplary turbine nozzle assembly shown in FIGS. 2 and 3.
Figure 7:
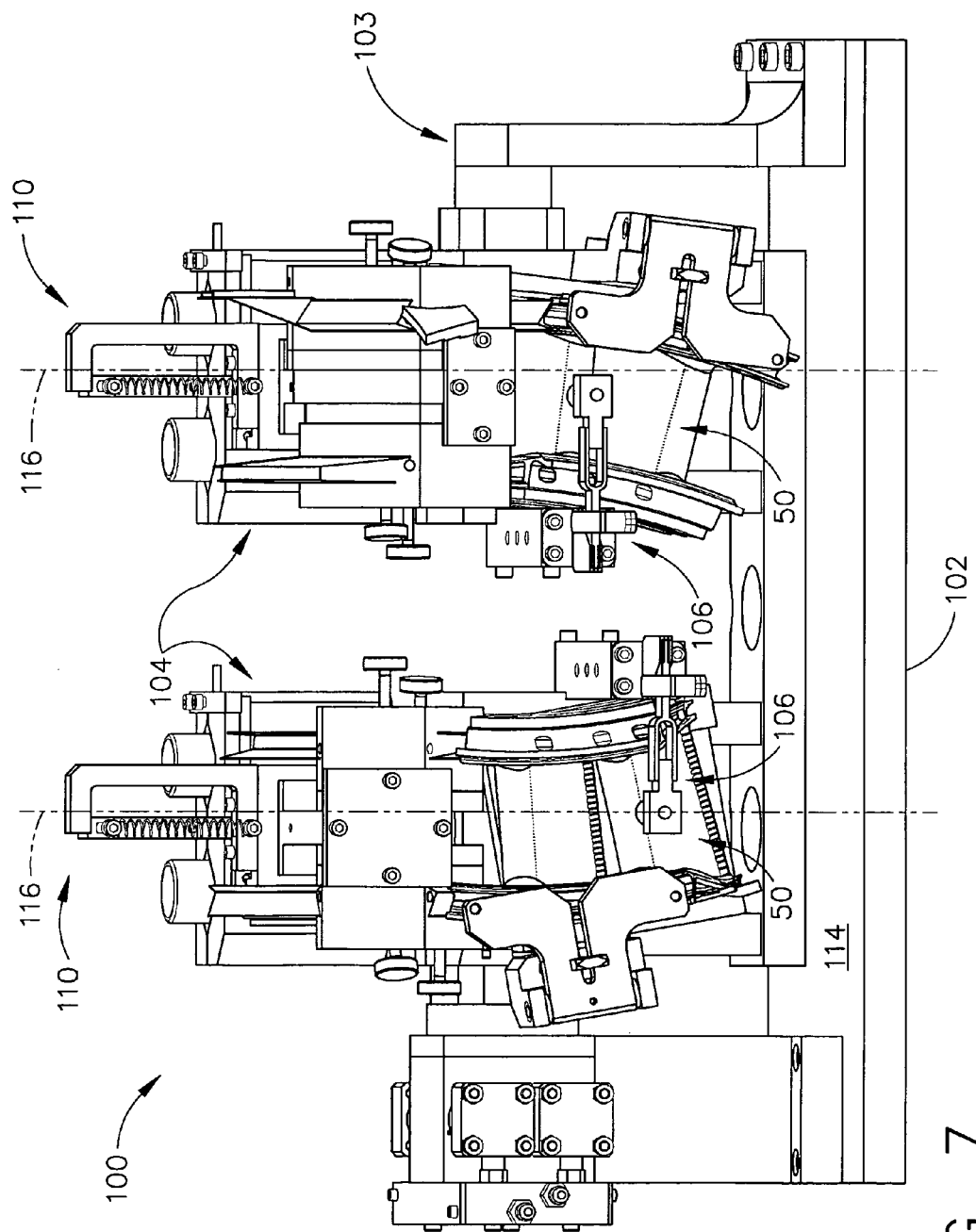
FIG. 7 is a side view of the exemplary fixture assembly shown in FIGS. 4 and 5 in a position that facilitates performing a manufacturing process on a component coupled to the fixture, such as the exemplary turbine nozzle assembly shown in FIGS. 2 and 3.

FIGS. 4 and 5 are perspective views of an exemplary embodiment of a fixture assembly 100 for use in manufacturing a component. FIGS. 6 and 7 are side views of fixture assembly 100. Although fixture assembly 100 may be used to manufacture any component, for example components of any operable shape, size, configuration, and/or material(s), in the exemplary embodiment fixture assembly 100 is used in manufacturing turbine nozzle assembly 50 (shown in FIGS. 2 and 3). It should be appreciated that the specific size, shape, and/or configuration of fixture assembly 100 described and/or illustrated herein is exemplary only. Accordingly, the specific size, shape, and/or configuration of fixture assembly 100 generally, as well as portions thereof, may be selected to accommodate other components than turbine nozzle assembly 50.

Fixture assembly 100 generally includes a base 102, two fixtures 104, and one or more clamps 106 coupled to each fixture 104. Fixture assembly 100 may be positioned adjacent a machining tool (not shown) and/or an inspection tool (not shown) for machining and/or inspecting various surfaces of turbine nozzle assembly 50, such as, in the exemplary embodiment, spline seal slots 62 and/or radial spline seal slots 64. It should be appreciated that the specific size, shape, and/or configuration of fixture assembly 100 generally, as well as portions thereof, may be selected to align, support, and/or fixedly secure turbine nozzle assembly 50 in orientations that accommodate machining and/or inspecting other turbine nozzle assembly surfaces than slots 62 and/or 64. In the exemplary embodiment, fixture assembly 100 includes two fixtures 104. For example, a turbine nozzle assembly 50 can be coupled to one of fixtures 104 such that face 66 can be positioned to be inspected and/or machined, and the assembly 50 can be coupled to the other fixture 104 such that face 68 can be positioned to be machined and/or inspected. However, although fixture assembly 100 is illustrated as including two fixtures 104, fixture assembly 100 may include any number of fixtures 104.

Fixtures 104 each include a plurality of supporting surfaces 107 (some of which may not be shown and/or labeled with reference numeral 107) for supporting turbine nozzle assembly 50 relative to fixture 104. As described and illustrated herein, supporting surfaces 107 are exemplary only. As such, and despite how supporting surfaces 107 are illustrated, fixtures 104 may each include any number of supporting surfaces that are each positioned anywhere on fixture 104 that enable the supporting surfaces to function as described herein. Moreover, to facilitate accurate machining of slots 62 and 64, fixtures 104 each include a plurality of datum location points 108 (some of which may not be shown and/or labeled with reference numeral 108) for locating turbine nozzle assembly datums 70. More specifically, when turbine nozzle assembly datums 70 are each aligned with a corresponding datum location point 108, turbine nozzle assembly 50 is located and orientated relative to fixture 104 for machining and/or inspecting slots 62 and 64 using a machining and/or inspecting tool adjacent fixture assembly 100, as will be described in more detail below. As described and illustrated herein, datum location points 108 are exemplary only. As such, and despite how datum location points 108 are illustrated, fixtures 104 may each include any number of datum location points that are each positioned anywhere on fixture 104 that enable the datum location points to function as described herein.

Clamp(s) 106 each facilitate coupling turbine nozzle assembly 50 to fixture 104 by applying force thereto. Specifically, clamp 106 is movable between a position (not shown) allowing turbine nozzle assembly 50 to be positioned on fixture 104 without interference from clamp 106, and a position (shown in FIGS. 4-7) wherein clamp 106 applies force to turbine nozzle assembly 50 to facilitate fixedly securing turbine nozzle assembly 50 to fixture 104 such that turbine nozzle assembly datums 70 are aligned with datum location points 108. Clamp(s) 106 may each be moved using any suitable means, such as, but not limited to, hydraulic, electrical, and/or pneumatic power. In some embodiments, clamp(s) 106 may each be or include a biasing mechanism. Clamp(s) 106 may each have any suitable size and/or shape that enable clamp(s) 106 to function as described herein. For example, clamp(s) 106 may each have any suitable size and/or shape for engaging and applying force to any portion of turbine nozzle assembly 50, whether such size, shape, portion, and/or engagement is described and/or illustrated herein. Fixtures 104 may each include other clamps that facilitate fixedly securing turbine nozzle assembly 50 to fixture 104 such that turbine nozzle assembly datums 70 are aligned with datum location points 108, but that are not described, illustrated, and/or labeled with a reference numeral herein.

Fixtures 104 are rotatably coupled to base 102 for rotation with respect to base 102 between a position 110 (shown in FIGS. 4 and 7) that facilitates coupling turbine nozzle assembly 50 to fixture 104 and a position 112 (shown in FIGS. 5 and 6) that facilitates performing a manufacturing process on turbine nozzle assembly 50. More specifically, position 110 may facilitate loading and/or unloading of turbine nozzle 50 from fixture 104. For example, position 110 may facilitate easier positioning, as compared with some known fixtures, of turbine nozzle assembly datums 70 adjacent fixture datum location points 108 such that datums 70 are each aligned with the corresponding location point 108 because portions of fixture 104 are more accessible in position 110 than in the position 112 that facilitates performing a manufacturing process on assembly 50. In some embodiments, position 110 may facilitate inspecting a position of turbine nozzle assembly 50 relative to fixture 104. As discussed above, position 112 may facilitate performing a manufacturing process on turbine nozzle assembly 50. For example, position 112 may facilitate positioning turbine nozzle assembly 50 adjacent, and/or in a path of, a machining tool (not shown) and/or an inspection tool (not shown) for machining and/or inspecting various surfaces of turbine nozzle assembly 50, such as, but not limited to, in the exemplary embodiment spline seal slots 62 and/or radial spline seal slots 64.

Position 110 may be any angular position relative to base 104 that facilitates coupling turbine nozzle assembly 50 to fixture 104 and/or inspecting a position of assembly 50 relative to fixture 104. For example, and although position 110 may have other angular positions relative to base 102, in the exemplary embodiment base 102 includes a generally horizontal surface 114 and, when in position 110, a central longitudinal axis 116 of each fixture 104 is generally parallel to surface 114, as shown in FIGS. 5 and 6. Similarly, position 112 may be any angular position relative to base 104 that facilitates performing a manufacturing process on turbine nozzle assembly 50. For example, and although position 112 may have other angular positions relative to base 102, in the exemplary embodiment, when in position 112, central longitudinal axis 116 of each fixture 104 is generally perpendicular to surface 114, as shown in FIGS. 4 and 7. Moreover, fixtures 104 may each be rotated an any angular distance between positions 110 and 112 that enables positions 110 and 112 to function as described herein. For example, and although positions 110 and 112 may be separated by other angular distances, in the exemplary embodiment positions 110 and 112 are separated by about 90° of rotation.

Figure 8:
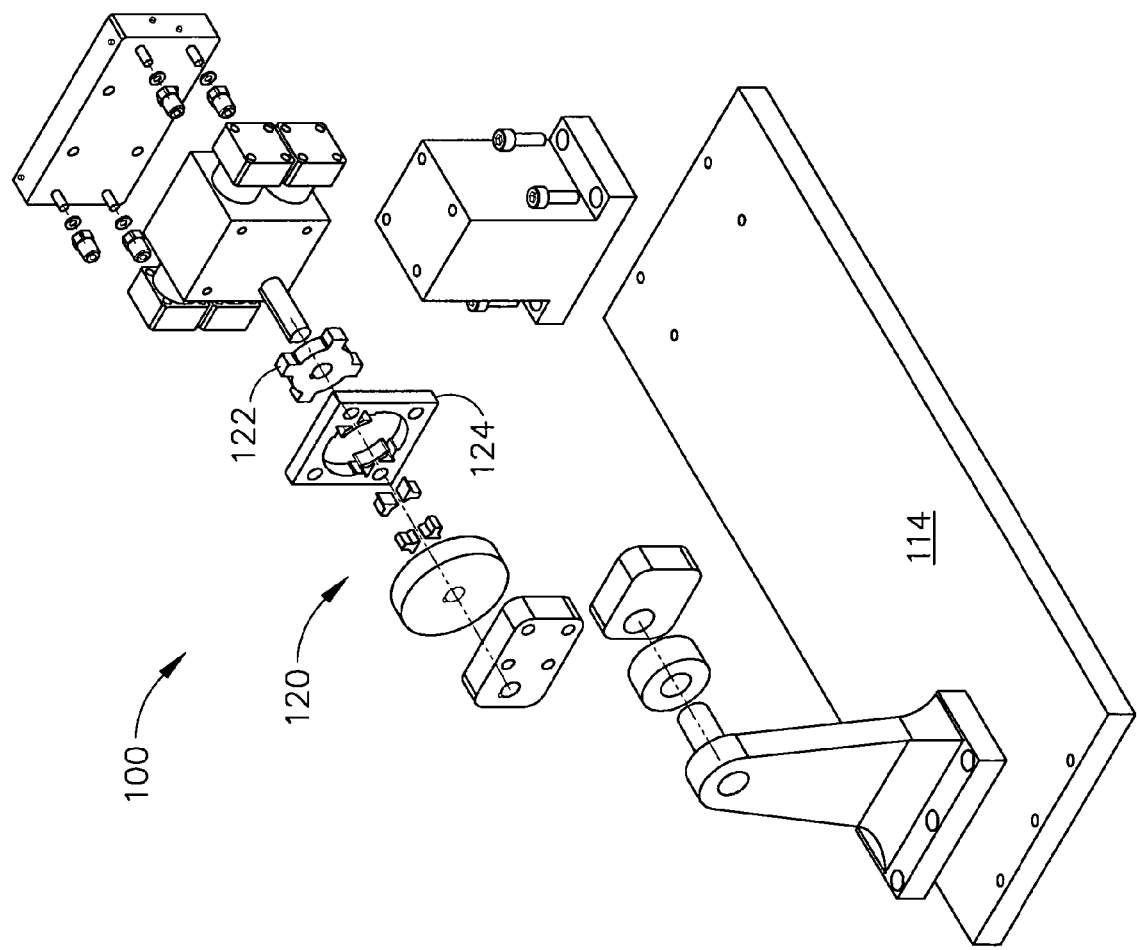
FIG. 8 is an exploded perspective view of a portion of the fixture assembly shown in FIGS. 4 and 5.

Fixtures 104 may be rotatably coupled to base 102 using any suitable structure and/or means, such as, but not limited to, rotary bearings (not shown in FIGS. 4-7). In the exemplary embodiment, fixture assembly 100 includes an actuator 118 that is coupled to base 102 and fixtures 104 for rotating fixtures 104 relative to base 102. Actuator 118 may rotate fixtures 104 using any suitable means, such as, but not limited to, hydraulic, electrical, and/or pneumatic power. Additionally or alternatively, fixtures 104 are rotated manually by an operator. In some embodiments, fixture assembly 100 may include any suitable locking device (not shown) that fixedly secured fixtures 104 in positions 110 and 112 such that fixtures 104 generally remain in position 110 during coupling of a turbine nozzle assembly 50 thereto (and/or during inspection of a position of an assembly 50 relative to a fixture 104) and such that fixtures 104 generally remain in position 112 while a manufacturing process is performed on assembly 50. Moreover, in some embodiments fixture assembly 100 may include any suitable device (whether the locking device) that facilitates preventing rotation of fixtures 104 past positions 110 and 112. For example, in the exemplary embodiment fixture assembly 100 includes a rack and pinion device 120 that includes an indexer 122 and a index-plate 124, as shown in FIG. 8, to facilitate locking fixtures 104 into positions 110 and 112 and/or to facilitate preventing rotation of fixtures 104 past positions 110 and 112.

In operation, fixtures 104 are rotated to position 110 and a turbine nozzle assembly 50 is coupled thereto, for example as described above, such that turbine nozzle datums 70 are each aligned with their corresponding datum location points 108. In some embodiments, a position of a turbine nozzle assembly 50 relative to a fixture 104 is inspected when fixtures 104 are in position 110. For example, and although any suitable inspection process, method, and/or device may be used, in some embodiments a shim is inserted between one or more turbine nozzle assembly datums 70 and the corresponding datum location point 108 to determine a distance between the datum(s) 70 and the corresponding datum location point(s) 108. Once a turbine nozzle 50 is coupled to a fixture 104 (and in some embodiments a position of an assembly 50 is inspected relative to a fixture 104), fixtures 104 rotated into position 112 and a manufacturing process is performed on one or more turbine nozzle assemblies 50 that are coupled to the fixtures 104. For example, in the exemplary embodiment spline seal slots 62 and/or radial spline seal slots 64 are machined within assemblies 50.

The above-described fixture assembly 100 may facilitate accurately manufacturing a component, and may facilitate reducing a cycle time of manufacturing the component, thereby possibly reducing an overall cost of manufacturing the component. Specifically, by being rotatable between a position that facilitates coupling the component to the fixture and a position that facilitates performing a manufacturing process on the component, fixture assembly 100 may facilitate easier loading and/or unloading of the component from the fixture, as compared with some known fixtures. Moreover, fixture assembly 100 may facilitate easier inspecting of a position of the component relative to the fixture, as compared with some known fixtures. Accordingly, loading and/or unloading of the component from the fixture, and/or inspection of a position of the component relative to the fixture, may possibly be accomplished in less time and without specialized operator training. Accordingly, a repeatability of manufacturing the component may be increased, while a cycle time of manufacturing the component may be reduced. Moreover, because in some embodiments rotation of the fixture to the position that facilitates performing a manufacturing process on the component is automated, and/or because in some embodiments the fixture may not be rotated past the position that facilitates performing a manufacturing process on the component, fixture assembly facilitates ensuring that the component is positioned in a predetermined position relative to a manufacturing tool, which may increase a repeatability of manufacturing the component.

Although the assemblies and methods described and/or illustrated herein are described and/or illustrated with respect to gas turbine engine components, and more specifically a turbine nozzle assembly for a gas turbine engine, practice of the assemblies and methods described and/or illustrated herein is not limited to turbine nozzle assemblies, nor gas turbine engine components generally. Rather, the assemblies and methods described and/or illustrated herein are applicable to any component and/or any manufacturing process.

Exemplary embodiments of assemblies and methods are described and/or illustrated herein in detail. The assemblies and methods are not limited to the specific embodiments described herein, but rather, components of each member and components of each assembly, as well as steps of each method, may be utilized independently and separately from other components and steps described herein. Each component, and each method step, can also be used in combination with other components and/or method steps.

When introducing elements/components/etc. of the assemblies and methods described and/or illustrated herein, the articles "a", "an", "the" and "said" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc.

While the invention has been described in terms of various specific embodiments, those skilled in the art will recognize that the invention can be practiced with modification within the spirit and scope of the claims.

What is claimed is:

1. A method for manufacturing a turbine nozzle assembly using a fixture, said method comprising:
   providing a first position of the fixture wherein a central longitudinal axis of the fixture is generally parallel with a generally horizontal surface supporting the fixture;
   providing a second position wherein the central longitudinal axis is generally perpendicular to the generally horizontal surface supporting the fixture;
   positioning at least one datum of the turbine nozzle assembly adjacent at least one datum location point on the fixture when the fixture is in the first position;
   removably coupling the turbine nozzle assembly to the fixture when the fixture is in the first position;
   rotating the fixture using a rack and pinion device from the first position into the second position while the turbine nozzle assembly remains coupled to the fixture, wherein the second position facilitates manufacturing the turbine nozzle assembly, the rack and pinion device including an indexer and an index plate
   locking the fixture in the second position with the indexer and the index plate; and
   performing a manufacturing process on the turbine nozzle assembly when the fixture is in the second position.

2. A method in accordance with claim 1 wherein positioning at least one datum further comprises aligning the at least one datum with the at least one datum location point.

3. A method in accordance with claim 1 wherein coupling the turbine nozzle assembly to the fixture further comprises fixedly securing the turbine nozzle assembly to the fixture using a clamp.

4. A method in accordance with claim 3 wherein fixedly securing the turbine nozzle assembly to the fixture further comprises clamping the turbine nozzle assembly to the fixture using at least one of hydraulic, pneumatic, and electrical power.

5. A method in accordance with claim 1 wherein performing a manufacturing process on the turbine nozzle assembly comprises machining a spline seal slot within the turbine nozzle assembly.

6. A method in accordance with claim 1 further comprising inspecting at least one of a location and an orientation of the turbine nozzle assembly with respect to the fixture when the fixture is in the first position.

7. A method in accordance with claim 6 wherein inspecting at least one of a location and an orientation further comprises: inserting a shim between the at least one turbine nozzle assembly datum and the at least one datum location point; and determining a distance between the at least one turbine nozzle assembly datum and the at least one datum location point.

8. A method in accordance with claim 1 wherein rotating the fixture further comprises rotating the fixture using at least one of hydraulic, pneumatic, and electrical power.

9. A method in accordance with claim 1 wherein providing a first position of the fixture further comprises rotating the fixture into the first position.

10. A method in accordance with claim 1 wherein rotating the fixture from the first position into the second position further comprises rotating the fixture about 90°.

* * * * *